April 1, 1930. W. C. BRUMDER 1,752,833
MIXING APPARATUS
Original Filed Aug. 6, 1923
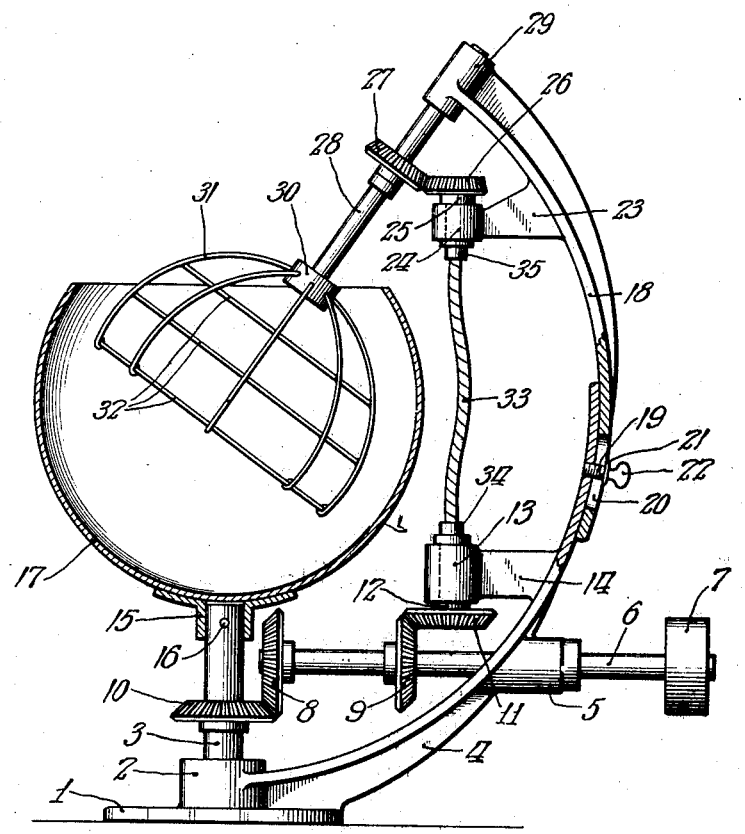
Inventor
William C. Brumder
By [signature] atty.

Patented Apr. 1, 1930

1,752,833

UNITED STATES PATENT OFFICE

WILLIAM C. BRUMDER, OF MILWAUKEE, WISCONSIN; THEKLA U. BRUMDER EXECUTRIX OF SAID WILLIAM C. BRUMDER, DECEASED

MIXING APPARATUS

Application filed August 6, 1923, Serial No. 655,889. Renewed August 15, 1929.

My invention relates to mixing devices, and more particularly to a mixing apparatus comprising a pair of juxtaposed members rotatable about intersecting axes at the same relative speed.

It is a purpose of the invention to provide a device of the above mentioned character which comprises an outer rotatable member and an inner rotatable member, said members being rotatable about intersecting axes at the same relative speed of rotation.

It is a further purpose of the invention to provide means of the above mentioned character comprising an outer bowl-like member having the outline of a portion of a sphere, and an inner rotatable member having the outline of a portion of a sphere and comprising meridian elements having a plurality of parallel circumferentially arranged elements connected to said meridian elements.

It is still a further purpose of the invention to provide means for adjusting the position of the axes of the two rotating members, so as to vary the relative position of the two members as desired.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings is shown a view partly in side elevation and partly in vertical section of my improved device.

Referring in detail to the drawings, the device comprises a base member 1 having a bearing 2 therein for a vertically extending shaft 3 and an upwardly extending curved bracket 4, which is provided with a bearing 5 for a horizontally extending shaft 6, which is provided with the pulley 7 and which has keyed thereto the bevel gars 8 and 9, the gear 8 meshing with a similar bevel gear 10 on the shaft 3 and the gear 9 meshing with a similar gear 11 keyed on the shaft 12, which is mounted in a bearing 13 on the arm 14 provided on the bracket 4. The shaft 3 has a flanged collar 15 keyed to the upper end thereof by means of a pin or other securing device 16, said flanged collar 15 being secured in any suitable manner to the bowl-like member 17 having an outline of a portion of a sphere.

The bracket member 4 has mounted thereon a cooperating bracket member 18 which is connected adjustably therewith by means of the pin and slot connection comprising the pin 19 entering the slot 20 in the member 18, said member 19 being provided with a flange 21 and a head 22 so as to permit clamping of the member 18 in adjusted position relative to the member 4. The member 18 is provided with an arm 23 having a bearing 24 therein for the shaft 25 carrying the bevel gear 26 which meshes with the bevel gear 27 provided on the shaft 28 which is mounted in a bearing 29 on the upper end of the member 18.

The shaft 28 has a head 30 provided on the lower end thereof from which the meridian elements 31 of a framework extend, which meridian elements are connected together by means of the circumferentially extending parallel framework elements 32, the members 31 and 32 together forming a skeleton framework having the outline of a portion of a sphere. The shaft 25 is driven from the shaft 12 by means of a flexible shaft 33 which is mounted to rotate with the heads 34 and 35 which are suitably keyed to said shafts 12 and 25 to rotate therewith.

It will be seen from the above that a mixing device is provided which comprises an outer rotatable bowl-like member having an outline corresponding to a portion of a sphere within which is mounted to rotate a skeleton framework having meridian elements and circumferentially extending elements, said skeleton framework rotating within said bowl-like member and said bowl-like member and said skeleton framework being curved on substantially parallel arcs, so that the skeleton framework can be rotated in close adjacency to the bowl-like member, if this is desired, and always maintain the same distance from the surface of the bowl-like member no matter what the position of said skeleton framework.

It will also be seen that the shaft 28 may be adjusted to any desired angular position with relation to the shaft 3, thus tilting the skeleton framework to any desired angle relative to the bowl-like member, and that the flexible shaft 33 may be made of such length as to permit of any desired range of movement of the shaft.

In the device shown the gearing is such that the inner and outer members will rotate at substantially the same speed, but this is immaterial, as all that is necessary is that the same rotate at the same relative speed, which would be true with a geared connection, such as that shown, whether the intermeshing gears were of the same size or not, the gears all being driven from a common shaft which is driven from a single source of power. While the inner skeleton framework and the bowl-like member are shown as being so connected by gearing in the drawings that they will rotate in opposite directions, it is to be understood that the invention is not intended to be limited thereto.

Having thus described my invention, what I desire to claim and secure by U. S. Letters Patent is:

1. A beater of the character described consisting of a framework having an outline of a portion of a sphere and having meridian elements as a portion of said framework.

2. A beater of the character described consisting of a framework having an outline of a portion of a sphere and having meridian elements as a portion of said framework, and a plurality of parallel circumferentially arranged elements associated with said meridian elements.

3. An apparatus of the character described comprising a bowl having an outline of a portion of a sphere, a beater comprising an open framework having an outline of a portion of a sphere, said beater and bowl having a common center and being rotatable upon intersecting axes, and means for moving said axes directly toward and away from each other about said center.

4. An apparatus of the character described comprising a bowl having an outline of a portion of a sphere, a beater comprising an open framework having an outline of a portion of a sphere, said beater and bowl having a common center and being rotatable upon intersecting axes, and means for adjusting the axis of said stirrer about the point of intersection of said axes in a plane including both of said axes.

In witness whereof, I hereunto subscribe my name this 25th day of July, A. D., 1923.

WILLIAM C. BRUMDER.